Feb. 28, 1939.   B. E. COHN   2,149,133
METHOD OF JOINING GLASS TO POROUS CERAMIC MATERIAL BY WELD
Filed Oct. 19, 1937

INVENTOR
BYRON E. COHN
BY Martin E. Anderson
ATTORNEY

Patented Feb. 28, 1939

2,149,133

UNITED STATES PATENT OFFICE 2,149,133

METHOD OF JOINING GLASS TO POROUS CERAMIC MATERIAL BY WELD

Byron E. Cohn, Denver, Colo.

Application October 19, 1937, Serial No. 169,779

3 Claims. (Cl. 49—81)

This invention relates to improvements in porous ware filters as distinguished from sintered or fritted glass filters and has reference more particularly to the method of joining of glass to porous ceramic material by weld.

Glass filters made from ground and sifted glass powder, fritted in suitable moulds, into porous disks of glass are old and have been extensively used for many different purposes. Such filter disks may be joined by fusion to glass tubes or other glass apparatus because both have the same, or substantially the same linear coefficients of thermal expansion.

In the carrying out of experiments in chemical laboratories, it is often necessary to attach the filter element to an apparatus made of glass, and this can be readily done where sintered or fritted glass filters are used because the linear coefficients of thermal expansion are so nearly alike and the parts to be joined have substantially the same melting point. Where ceramic filters are used these conditions are not present and it therefore becomes desirable to provide ceramic filters with glass extensions to facilitate their use.

It is also well known that filters can be made from refractory materials other than glass, especially such as is known as porous porcelain and porous alumina. This type of filter which we designate from the mode of manufacture as ceramic filters is superior for many purposes to glass filters. Ceramic filters stand higher temperatures than glass and are also more resistant to the action of certain chemicals, and they can be manufactured at less cost. At any event it is often desirable to employ porous ceramic filters instead of the fritted glass filters.

It is the object of this invention to join porous ceramic material to glass by weld as distinguished from fusion and this invention relates to the process of forming a weld between glass and such material and to an article formed by such weld.

The porous ceramic materials to which reference is had here are not limited to porcelain-like materials whose linear coefficients of expansion lie between 3 to 4 times $10^{-6}$ per degree centigrade, but include carborundum refractories and alundum refractories of markedly different expansion characteristics.

In order to most clearly describe the invention so that it can readily be understood, reference will be had to the accompanying drawing in which an immersion filter tube constructed in accordance with this invention has been illustrated, as one example, and in which.

Figures 1, 2:
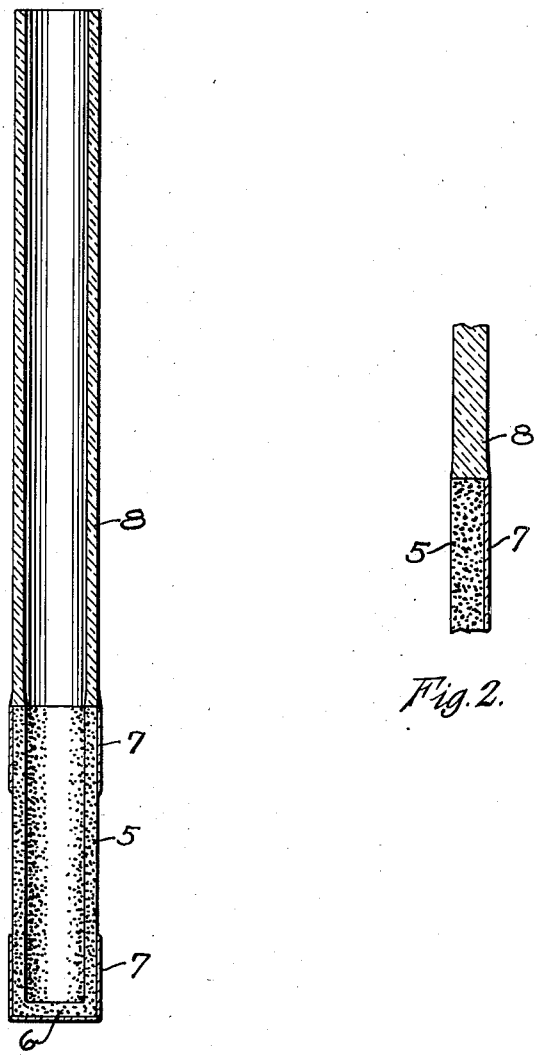
Figure 1 is a longitudinal diametrical section through the tube.
Figure 2 is a fragmentary section taken at the weld and shows the parts to an enlarged scale.

In the drawing a tubular immersion filter has been illustrated. The filter element has been designated by numeral 5 and consists of a short cylinder having one end closed as indicated by reference numeral 6 and the other end open. In the particular instance illustrated, both ends of the filter element have been glazed by the usual method of immersing them in a liquid glaze and subjecting the element to heat, but this is not essential.

An end weld joint between a tubular ceramic filter has been illustrated, but it is also possible to weld disks of porous ceramic material into the end of a glass tube, the disks must, of course, be held in the desired position by some suitable means such as carbon pencils in corks. The specific filter shown is illustrative only and has been selected as one example of a ceramic filter welded to glass regardless of the shape of the filter and where it is attached to the glass tube.

The filter element is made from porous ceramic material, preferably of such composition that it is highly refractory and porous. The ceramic material used for the filter element may differ and may contain one or more of the following: aluminum oxide (alundum), carborundum, feldspar, kaolin, bauxite, etc. The specific ceramic material is not of importance, and as before stated, the term porous ceramic material is used herein in a sense broad enough to include all suitable filter materials of this type.

It is often desirable to be able to see the filtrate, and for this purpose, and for the further reason that it is often desirable to make the immersion filter an integral part of a laboratory apparatus, the filter element has been illustrated as welded to one end of a glass tube. The tube may be of any glass having a linear coefficient of thermal expansion suited to the porous ceramic material. With porous ware whose linear coefficient of expansion is in the range from 3 to $5\times 10^{-6}$ per degree centigrade, the ordinary commonly available Pyrex glass is very suitable. Pyrex glass, however, is quite unsuited in the case of alumina filters. It has been determined by the computation of stresses involved that for most glasses and ceramic filter materials, a glass which has a linear coefficient of thermal expansion that differs from that of the porous material by an amount greater than $4.5\times 10^{-6}$ per degree centigrade cannot successfully be welded to such material. For most purposes, it is desirable that the difference of mean linear coefficients of thermal expansion in the temperature range bounded by the annealing temperature of the glass and the room temperature should not exceed $2 \times 10^{-6}$ per degree centigrade.

One of the conditions necessary for the successful intersealing of any two materials is that the strength of adhesion must be greater than the forces which act to separate the weld; whether these forces act at the weld or in either of the welded materials. It is also necessary that one of the two materials wet the other but since there is no difficulty on this score it will not be further considered.

In order to make a successful weld between porous ceramic material and glass the former should be smooth on the edge to be sealed and may be glazed. The porous ceramic material must then be raised, fairly gradually to sealing temperature (bright red heat); otherwise its greater thickness (relative to glass) and its low conductivity may tend to set up large local strains. The heat should preferably be directed for the most part upon the filter material after the glass begins to stick to it. The filter material does not soften at sealing temperature and by directing the heat mostly upon it the work is easier to handle.

When Pyrex glass is welded to porous porcelain or other porous ceramic material, the heat should be slightly greater than that used for fusing Pyrex to Pyrex. The joint should be blown as in glass, but no large pull attempted as the glass will pull off the filter material. It will be explained here that the joint between the porous ceramic filter material and glass is not a fused joint but rather a weld in which the material of the glass is brought into such close contact with the porous material of the filter that molecular adhesion results, but since the filter material is not fused, there can be no alloying or fusion. After the joint has been effected, it should be well annealed. Since the glass is an undercooled liquid, attention to annealing will reduce the strain as the temperature of set will be below the so-called softening temperature. Gradual cooling also avoids temporary temperature gradient strains.

The process described for the welding of glass to porous ceramic material is but one successful method and may be also effected by electrical heating in somewhat the fashion previously described, or in entirely different manner, as for example, inside a kiln.

Attention is directed in particular to the fact that this invention relates to porous ware of the type used for filters, which makes it possible to obtain a good joint by a welding action because the glass can penetrate the interstices and form an interlock that is strong and reliable. It is evident that with ordinary porcelain, where the grain is fine, the interlock actions obtained when porous ware is used is absent. The interlock action is, however, only ancilliary to the molecular adhesion.

Having described the invention what is claimed as new is:

1. The method of welding kiln fired articles of porous ceramic material to glass having such linear coefficient of expansion that its mean value over the cooling range does not differ from the mean value of the porous material by an amount greater than $4.5 \times 10^{-6}$ per degree centigrade, which consists in heating the porous material and the glass to a temperature above that at which the glass softens sufficiently to permit it to wet the porous material, forcing the glass and the porous materials together with sufficient pressure to produce such close contact between the molecules of the two materials as to bring into action molecular adhesion, and then permitting the materials to cool slowly to normal temperature.

2. The method of welding porous ware to glass to form filters for the separation of liquids from solids, which consists in smoothening the edge of the porous porcelain, which is to be sealed, to the glass, heating the porcelain and the glass to a temperature at which the latter begins to flow, bringing the edges into contact with sufficient pressure to bring the two materials into such close contact that the glass will penetrate the interstices in the porcelain to which the weld is to be effected and to form such intimate contact therewith that the two materials will be joined by the action of molecular adhesion.

3. The method of forming immersion filters from porous kiln fired ceramic material and a glass tube whose linear coefficient of thermal expansion does not differ from that of the porous material by an amount greater than $4.5 \times 10^{-6}$ per degree centigrade, which consists in, smoothening the edges of the porous material heating the porous material and the glass to a point slightly above that at which the glass softens, bringing the heated edges of the two materials into intimate contact whereby the softened glass will wet the porous material and be brought into sufficiently intimate contact therewith to effect a weld by the action of molecular adhesion, and then permitting the parts to cool slowly.

BYRON E. COHN.